3,262,883
DEFOULING ION EXCHANGE RESINS BY THE REMOVAL OF IRON OXIDES THEREFROM
Sallie A. Fisher, Levittown, Pa., assignor to Rohm & Haas Company, Philadelphia, Pa., a corporation of Delaware
No Drawing. Filed Nov. 13, 1962, Ser. No. 237,293
7 Claims. (Cl. 252—105)

The present application is a continuation-in-part of my U.S. application Serial No. 12,503 which has been abandoned.

This invention relates to the removal of iron oxides from both natural and synthetic ion exchangers. In particular, it is concerned with a method and composition for accomplishing such removal without deleteriously affecting the exchangers themselves.

In the ion-exchange field the problem of removing iron oxides from synthetic organic and the natural inorganic ion exchangers, which are employed under conditions conducive to the fouling of the resin or other ion exchanger with such compounds, has been one of very long standing. Unless the iron oxides are removed, the ion exchangers become so contaminated therewith that further ion-exchange processing with those materials is practically out of the question. One reason for this is that the pores of the resins become so plugged with the iron oxides that there is relatively little surface area in those pores which remain sufficiently exposed for ion exchange to take place at a large number of the resins' ion exchange sites.

I have found that the iron oxides which foul the various types of ion exchangers can readily be solubilized and removed therefrom by the use of a new process employing a composition comprising a specific reducing agent, namely, a soluble dithionite salt (e.g., $Na_2S_2O_4$), and a complexing agent such as potassium or sodium tripolyphosphate ($Na_5P_3O_{10}$). Some of the advantages of such a composition include the fact that it is nearly neutral and it is effective at low concentrations, such as 1%.

The effectiveness of the described composition and process is clearly attributable to the unique combination of the specific sulfur-containing reducing agent, namely, the dithionite, and any one of a number of chelating agents. This combination clearly is much more efficient than is either component when used alone, as is demonstrated from the data in Example 1 and Table I below. Those data also show the superiority of the present invention over the prior art means for removing iron oxides.

Example 1

Six twenty-gram samples of an organic cation-exchange resin of commerce, each containing approximately 215 p.p.m. of iron in its oxide form, were employed. Each resin sample was shaken with one of the six reagents listed in Table I for one hour, a different reagent being used for each of the different samples. In each case, the solution was filtered off, approximately one gram of sample being removed for analysis and the remainder of the resin being treated again with a second 100 ml. of fresh reagent for another hour. Analyses for residual iron were performed on each of the treated resin samples after one and two such contacts. The results are listed in Table I.

TABLE I.—COMPARISON OF IRON REMOVAL AGENTS

| Agent | Residual Iron (p.p.m.) | |
| --- | --- | --- |
| | One Contract | Two Contracts |
| 4% HCl at 80° C | 155 | 85 |
| 4% HCl + 0.5% $H_2C_2O_4$ at 80° C | 125 | 75 |
| 2% $Na_5P_3O_{10}$ at room temperature | 210 | 175 |
| 0.5% $Na_2S_2O_4$ at room temperature | 205 | 170 |
| 2% $Na_5P_3O_{10}$ and 0.5% $Na_2S_2O_4$ at room temperature | 85 | 5 |

Approximately the same results are obtained upon similar treatments using samples of a commercial organic anion exchanger in lieu of the cation exchanger. The same holds true when inorganic natural and synthetic ion exchangers, e.g., aluminum silicate gel zeolites and natural greensands, are employed.

The effectiveness of the described composition and process in solubilizing iron oxides is not critically dependent upon either the ratio or concentration of the reagents, as is demonstrated in Example 2 and Table II which follow.

Example 2

Six fifty-ml. (approximately 40 gm.) samples of commercial organic cation-exchange resins, each containing 172 p.p.m. Fe in oxide form, were respectively loaded into each of six ion-exchange columns approximately one inch in diameter. Solutions to be tested for iron-removal ability were passed down through these columns at the rate of 1.67 ml./min. except for one run which was done at 3.3 ml./min. After rinsing the resin samples in each column with deionized water, each of the samples was remixed and a portion taken for iron analysis. The analytical results are shown in Table II.

TABLE II.—IRON REMOVAL IN FLOWING SYSTEM

| Volume Reagent | Percent $Na_2S_2O_4$ | Percent $Na_5P_3O_{10}$ | Residual Fe (p.p.m.) |
| --- | --- | --- | --- |
| 50 | 0 | 0 | 172 |
| 50 | 1.0 | 0.5 | 71 |
| 50 | 1.0 | 2.0 | 37 |
| 100 | 0.5 | 1.0 | 28 |
| 150 | 0.33 | 0.67 | 37 |
| *50 | 1.0 | 1.0 | 40 |

*Flow rate was 3.3 ml./min.

Substantially identical results are obtained upon similar treatments using samples of a commercial organic anion exchanger in lieu of the cation exchanger. The same holds true when inorganic natural and synthetic ion exchangers (e.g., aluminum silicate gel zeolites and natural greensands) are employed.

The only limiting factor as to the maximum concentration of the reagents is the volume that one may desire to put through the system. As for the minimum concentration, as low as 0.01% of either reagent functions satisfactorily. With regard to the ratio of the reducing agent and the complexing or chelating agent, an optimum would be either a one-to-one or a two-to-one equivalency (the "two" in the latter ratio representing either agent). Of the two ratios, the one-to-one is perhaps to be preferred.

That the exceptional effectiveness in removing iron oxides proved by the combination of the present invention is quite specific for the dithionite used therein is shown in Example 3 and Table III.

*Example 3*

Six fifty-ml. (approximately 40 gm.) portions of a standard commercial cation exchanger, each containing 172 p.p.m. Fe in oxide form, were respectively loaded into each of six ion-exchange columns approximately one inch in diameter. Fifty-ml. portions of solutions of the combined compositions (i.e., a pair consisting of one reducing agent and one chelating agent) listed in Table III were passed through these resin beds at the rate of 1.67 ml./min. The resin columns were each rinsed with deionized water; and thereafter the resin was removed from each column, separately mixed, and analyzed for iron oxide content. Results of the individual treatments are given in Table III.

TABLE III.—IRON REMOVAL BY VARIOUS REDUCING AGENTS PLUS TRIPOLYPHOSPHATE

| Reducing Agent | Chelating Agent | Fe (p.p.m.) |
|---|---|---|
| None | None | 172 |
| 1% $Na_2SO_3$ | None | 169 |
| 0.5% $Na_2SO_3$ | 2% $Na_5P_3O_{10}$ | 175 |
| 1% $Na_2S_2O_6$ | 2% $Na_5P_3O_{10}$ | 169 |
| 1% $Na_2S_2O_4$ | 2% $Na_5P_3O_{10}$ | 37 |
| 1% $Na_2S_2O_3$ | 2% $Na_5P_3O_{10}$ | 166 |
| 1% $Na_2S$ | 2% $Na_5P_3O_{10}$ | 169 |

Upon repeating the experiment set forth in Example 3, using commercial anion exchangers in lieu of the cation exchangers, practically identical results are obtained. When inorganic natural or synthetic ion exchangers, such as the aluminum silicate gels or natural greensands, are employed, the same sort of results are obtained.

Although the reducing agent in the present invention is specific for the dithionite, the complexing agent may be chosen from among the many compounds that comprise chelating agents as a class. An indication of the usefulness of various chelating compounds in the present invention may be gleaned from Table IV, the data for which were obtained from Example 4.

*Example 4*

Six fifty-ml. (approximately 40 gm.) portions of a standard commercial cation exchanger, each containing 172 p.p.m. Fe in oxide form, were respectively loaded into each of six ion-exchange columns approximately one inch in diameter. Fifty-ml. portions of solutions of the combined compositions (i.e., a pair consisting of one reducing agent and one chelating agent) listed in Table IV were passed through these resin beds at the rate of 1.67 ml./min. The resin columns were each rinsed with deionized water; and thereafter the resin was removed from each column, separately mixed, and analyzed for iron oxide content. Results of the individual treatments are given in Table IV.

TABLE IV.—IRON REMOVAL BY VARIOUS COMPLEXING AGENTS PLUS DITHIONITE

| Reducing Agent | Chelating Agent | Fe (p.p.m.) |
|---|---|---|
| None | None | 172 |
| 1% $Na_2S_2O_4$ | 2% $Na_5P_3O_{10}$ | 37 |
| 1% $Na_2S_2O_4$ | 2% $(NaPO_3)_6$ | 37 |
| 1% $Na_2S_2O_4$ | 2% $Na_4P_2O_7$ | 45 |
| 1% $Na_2S_2O_4$ | 2% $Na_2HPO_4$ | 120 |
| 1% $Na_2S_2O_4$ | None | 90 |
| None | 2% $Na_5P_3O_{10}$ | 170 |
| 1% $Na_2S_2O_4$ | 2% ethylenediamine tetrataacetic acid. | 25 |

As before, in this experiment as well, in lieu of the organic cation exchangers there may be used organic anion exchangers, inorganic natural or synthetic exchangers (e.g., aluminum silicate gels or natural greensands), and no substantial difference in results will be observed.

Of particular interest in the defouling of iron oxide-contaminated ion exchangers is the fact that the process may be operated either batchwise or in a flowing system. This is illustrated in Examples 1 and 2 and in Tables I and II. Another factor which is highly advantageous in the present invention is the relatively normal resistance to oxidation of ion exchangers treated in accordance therewith. In other words, the treatments of the present invention hardly affect the ability to resist oxidation which the ion-exchanging material may have had before being put to use. Furthermore, the invention is applicable to all the well-known forms of ion-exchange resins, e.g., the weakly and strongly acidic or basic types of all sorts, such as the sulfonic, carboxylic, amine-based quaternary ammonium based, etc. These comprise the well-known organic exchangers; but, of course, the inorganic natural and synthetic types are also included, as was mentioned several times throughout the specification.

As illustrated by the data in Table I, it is readily apparent that the treatment in accordance with the present invention far outstrips the hot hydrochloric acid and oxalic acid treatments of the prior art. The fact that this improvement can be accomplished under room temperature operating conditions makes the invention all the more attractive.

As will be apparent to those with average skill in the art, various changes may be made in the details disclosed in the foregoing specification without departing from the invention or sacrificing the advantages thereof. For example, any soluble form of the dithionite or chelating agent will be satisfactory, the sodium form of each merely being indicated previously because of its relative cheapness and availability. The potassium form of either, or any other such soluble salt, would be just as useful. Likewise, one need not be confined to using the dithionite salts as such, as soluble derivatives thereof may also be employed with good success.

I claim:

1. A method for defouling without deleteriously affecting ion exchangers by removing iron oxide which is deposited within their gel structure, comprising contacting the iron oxide on the substance bearing same with an aqueous solution of at least 0.01% of a water-soluble dithionite salt and at least 0.01% of a chelating agent from the class consisting of sodium and potassium polyphosphates and ethylenediamine tetraacetic acid for such time as is necessary to remove the iron oxide from said substance to the extent desired.

2. The method of claim 1 in which the dithionite and the chelating agent are present in the proportion chosen from one of the following equivalencies: 1 to 1, 1 to 2, and 2 to 1.

3. The method of claim 1 in which the chelating agent is a member of the group consisting of $X_5P_3O_{10}$, $(XPO_3)_6$, $X_4P_2O_7$, and ethylenediamine tetraacetic acid, the X in the various compositions being an alkali metal from the class consisting of sodium and potassium.

4. The method of claim 3 in which the chelating agent is $X_5P_3O_{10}$, the X being an alkali metal from the class consisting of sodium and potassium.

5. The method of claim 3 in which the chelating agent is $(XPO_3)_6$, the X being an alkali metal from the class consisting of sodium and potassium.

6. The method of claim 3 in which the chelating agent is $X_4P_2O_7$, the X being an alkali metal from the class consisting of sodium and potassium.

7. The method of claim 3 in which the chelating agent is ethylenediamine tetraacetic acid.

References Cited by the Examiner

UNITED STATES PATENTS

| | | | |
|---|---|---|---|
| 2,472,684 | 6/1949 | Rossi | 252—105 |
| 2,488,832 | 11/1949 | Rossi | 252—105 |

(Other references on following page)

| | UNITED STATES PATENTS | | |
|---|---|---|---|
| 2,707,144 | 4/1955 | Sparrow et al. | 252—188 XR |
| 2,707,145 | 4/1955 | Sparrow et al. | 252—188 XR |
| 2,749,306 | 6/1956 | Coleman | 252—192 XR |
| 2,995,522 | 8/1961 | Joyce | 252—188 |

FOREIGN PATENTS 1,186,901  3/1959  France.

OTHER REFERENCES

"Sequestrene," pub. by Geigy Industrial Chemicals (1952), pages 30, 50 relied on.

ALBERT T. MEYERS, *Primary Examiner.*

JULIUS GREENWALD, *Examiner.*

M. WEINBLATT, *Assistant Examiner.*